United States Patent [19]

Bruno et al.

[11] Patent Number: 5,073,400

[45] Date of Patent: Dec. 17, 1991

[54] SOFTNESS AND FLAVOR RETENTION IN RAISINS

[75] Inventors: Richard C. Bruno, Lodi; Teresa M. Freeto; Tony R. Garcia, both of Fresno, all of Calif.

[73] Assignee: Sun-Maid Growers of California, Kingsburg, Calif.

[21] Appl. No.: 554,622

[22] Filed: Jul. 18, 1990

[51] Int. Cl.$^5$ ............................................. A23L 00/00
[52] U.S. Cl. ..................................... 426/639; 426/321; 426/640
[58] Field of Search ....................... 426/639, 640, 321

[56] References Cited

U.S. PATENT DOCUMENTS

| | | | |
|---|---|---|---|
| 3,952,112 | 4/1976 | Fulger et al. | 426/321 |
| 4,146,652 | 3/1979 | Kahn et al. | 426/564 |
| 4,199,605 | 4/1980 | Kahn et al. | 426/330.6 |
| 4,220,671 | 9/1980 | Kahn et al. | 426/321 |
| 4,234,611 | 11/1980 | Kahn et al. | 426/321 |
| 4,235,936 | 11/1980 | Kahn et al. | 426/330.3 |
| 4,237,146 | 12/1980 | Kahn et al. | 426/330 |
| 4,244,976 | 1/1981 | Kahn et al. | 426/330.1 |
| 4,244,977 | 1/1981 | Kahn et al. | 426/330.2 |
| 4,248,902 | 2/1981 | Eapen et al. | 426/332 |
| 4,308,287 | 12/1981 | Kahn et al. | 426/43 |
| 4,350,711 | 9/1982 | Kahn et al. | 426/639 |
| 4,364,968 | 12/1982 | Waitman et al. | 426/639 |
| 4,390,550 | 6/1983 | Kahn et al. | 426/639 |
| 4,514,428 | 4/1985 | Glass et al. | 426/639 |
| 4,542,033 | 9/1985 | Agarwala | 426/639 |
| 4,551,348 | 11/1985 | O'Mahoney et al. | 426/639 |
| 4,626,434 | 12/1986 | O'Mahoney et al. | 426/639 |
| 4,775,545 | 10/1988 | Augustine et al. | 426/639 |
| 4,889,730 | 12/1989 | Roberts et al. | 426/639 |

FOREIGN PATENT DOCUMENTS 2036162 2/1987 Japan .................................. 426/639

*Primary Examiner*—Donald E. Czaja
*Assistant Examiner*—Jean L. Aberle
*Attorney, Agent, or Firm*—Townsend and Townsend

[57] ABSTRACT

Raisins are treated by blanching, followed by fructose infusion, tempering and drying, all at elevated temperatures, to increase the fructose:dextrose weight ratio in the raisins to a level exceeding 1.5:1, without substantially increasing the total sugar content. The resulting raisins retain moisture and their natural raisin flavor in storage, even when combined with relatively dry, moisture absorptive food materials such as dry cereals, cakes and breads, and powdered baking mixes.

11 Claims, No Drawings

SOFTNESS AND FLAVOR RETENTION IN RAISINS

This invention lies in the field of raisin processing, and relates in particular to food preparations which combine raisins with moisture absorptive food ingredients such as dry cereals and baked goods.

BACKGROUND AND SUMMARY OF THE INVENTION

The preservation of raisins in storage and packaging has always been a concern. Airtight or moisture retentive packaging is generally used to address this concern, but the problem is often heightened considerably when the raisins are combined with other food ingredients which are relatively dry and moisture absorptive. Thus, raisins combined with such food stuffs as cereals, flours or dry mixes, or baked into such preparations as breads and cakes in packaging which may be opened and reclosed several times during use, create an ever present concern for preservation of the quality of the raisins. When raisins begin to dry out, they undergo a deterioration in taste and mouthfeel, making them less palatable and therefore less appealing to consumers.

The use of humectants such as glycerol and sorbitol is disclosed by Fulger, et al., U.S. Pat. No. 3,952,112 (Apr. 20, 1976) and U.S. Pat. No. 4,103,035 (July 25, 1978). Glycerol is the humectant of choice in these disclosures. Glycerol is less than fully satisfactory, however, since it is not a natural food ingredient and lacks a natural food flavor. Glycerol in fact has its own taste which it imparts to the raisins, replacing or masking the raisins' natural taste.

It has now been found that the textural quality of raisins can be retained, with no loss of the natural raisin flavor, in environments which would otherwise cause a loss of these qualities, by elevating the ratio of fructose to glucose above that naturally inherent in raisins without lowering the total sugar content, and that such elevation can be achieved by a process involving blanching, infusion, tempering and drying under controlled conditions of temperature and time. The result are raisins with all natural ingredients and with the well known and well liked raisin taste, plus the ability to retain both this taste and the soft texture of fresh raisins in moisture absorptive environments.

DETAILED DESCRIPTION OF THE INVENTION AND PREFERRED EMBODIMENTS

Raisins in untreated form contain a combination of sugars, primarily fructose and glucose (dextrose), with a minor amount of sucrose. The amounts are generally within the ranges of 34.8% to 39.2% fructose (average 37.0%), 31% to 34.5% glucose (average 32.75%), and 0.4% to 1.0% sucrose, all on a weight basis. The weight ratio of fructose to glucose in untreated raisins based on these averages is 1.13:1, and is generally within the range of about 1:1 to 1.3:1. The combination of these two sugars in untreated raisins, which have a moisture content of 15% to 18%, generally amounts to about 68% to about 70% by weight of the raisin. Treatments involving glycerol infusion generally tend to lower both the fructose and glucose contents in equal proportions, generally by about 10%.

In accordance with the present invention, the fructose:glucose weight ratio is raised to a range of about 1.5:1 to about 3.0:1, preferably a range of about 2.0:1 to about 3.0:1. The total sugar content either remains substantially unchanged or is slightly raised. On the whole, the invention involves the replacement of a portion of the glucose with fructose to produce a ratio within the ranges set above.

This is achieved by a process which includes the following sequence of steps:
(1) blanching,
(1) infusion,
(2) tempering, and
(3) drying.

Prior to blanching, the raisins are mechanically screened and graded to desired size, then washed and sorted to remove defects. The moisture level at this point is generally around 15% to 18%.

Blanching involves raising the moisture level of the raisins by soaking them in hot water. Temperature, exposure time and other conditions in the blanching step are not critical and may be varied widely. In most cases, however, the blanching medium is hot potable water at about 120° F. to about 190° F., preferably about 130° F. to about 150° F., and the exposure time is at least about one minute and preferably ranges from about 1 minute to about 10 minutes, most preferably from about 3 minutes to about 4 minutes. The water will have been chlorinated and filtered prior to use, but contains no functional additives. Blanching is most conveniently performed in a rotary reel type blancher containing an auger to control the rate of exposure. Such equipment is common in the raisin industry. Following the hot water treatment, the blanched raisins are dewatered via screening and air jets to reach a moisture content of between about 22% and about 35%, preferably about 26%.

The infusion step is performed by contacting the raisins with a liquid form of fructose at a controlled elevated temperature in a concentration sufficiently high to cause a net inward diffusion of fructose into each raisin. While the actual liquid form of the fructose may vary, a preferred and most convenient form is the use of an aqueous solution, containing fructose at a concentration of at least about 60% by weight, preferably at least about 70% by weight. Specific examples of aqueous fructose solutions are 75% and 77% solutions. The infusion is performed at a temperature within the range of about 130° F. to about 200° F., preferably from about 140° F. to about 175° F., and most preferably from about 150° F. to about 170° F. The pressure in the atmosphere in which the infusion step is performed is not critical; atmospheric pressure, or pressure slightly above atmospheric due to the use of equipment with high pressure pumps and vanes, will generally suffice.

The infusion step is generally accompanied by agitation of the raisins in the infusion liquid. A conventional means of agitation may be used. A particularly convenient type of apparatus for this purpose which controls the temperature, agitation, degree of contact, and residence time is disclosed in Gunnerson, U.S. Pat. No. 4,169,787 (Oct. 2, 1979). Incorporated in this apparatus are screen conveyors to remove the raisins through the solution and spray nozzles directed under the liquid surface for agitating and circulating the solution. Supplemental quantities of the infusion solution are added as needed to replace or replenish the depleted solution. The disclosure of U.S. Pat. No. 4,169,787 is incorporated herein by reference. Contact time in the infusion step between the raisins and the infusion solution will be at least about thirty seconds, preferably from about thirty seconds to about ninety seconds, and most preferably about forty-five seconds.

The tempering step is an equilibration step, in which the raisins are retained in an atmosphere in equilibrium with the infusion solution. This will generally involve submerging the infused raisins in the infusion liquid, without the need for agitation. Contact may be continuous or intermittent, as it is in situations where the agitation repeatedly and momentarily removes the raisins from the infusion liquid. The temperature at which this is performed will generally be within the range of about 80° F. to about 120° F., and preferably from about 90° F. to about 110° F. The pressure may be varied and is not critical. Atmospheric pressure is most convenient and will suffice. The tempering is continued for a period of time of at least about four hours, preferably from about four hours to about 24 hours, and most preferably about 18 hours.

After tempering, the fruit is dried in conventional dehydrators. Drying is performed in any dry gaseous atmosphere, of which air will suffice. The temperature will generally be maintained below about 175° F., preferably from about 140° F. to about 165° F., and most preferably from about 150° F. to about 160° F. The length of time is not critical provided that the fruit is adequately dried. In most cases, drying is continued until the moisture content is lowered to about 155 to about 18%, and this generally takes about 4 to 6 hours.

In a typical implementation of the process of this invention, processing steps in addition to those described above may be included to serve the same functions which they perform in conventional raisin processing.

The foregoing is offered primarily for purposes of illustration. Those skilled in the art of raisin processing will be aware of various ways in which the steps of the procedure can be modified or supplemented beyond the description offered herein without departing from the spirit and scope of the invention.

What is claimed is:

1. A method for treating raisins to retain softness when incorporated into food preparations in which said raisins are in contact with dry absorptive food ingredients, said method comprising:
   (a) blancing said raisins by contacting said raisins with water at a temperature of about 120° F. to about 190° F. for at least about one minute;
   (b) infusing said raisins with fructose by continuously agitating said raisins in a liquid medium containing fructose as the sole saccharide at a temperature of from about 130° F. to about 200° F. for from about thirty seconds to about ninety seconds to raise the fructose:dextrose weight ratio in said raisins to from about 1.5:1 to about 2.0:1;
   (c) tempering raisins so infused by retaining said raisins in an atmosphere which is in equilibrium with said liquid medium, at a temperature of from about 80° F. to about 120° F. for at least about 4 hours; and
   (d) drying raisins so tempered in air at a temperature of about 175° F. or below.

2. A method in accordance with claim 1 in which said liquid medium is an aqueous solution of fructose at a fructose concentration of at least about 60% by weight.

3. A method in accordance with claim 1 in which said liquid medium is an aqueous solution of fructose at a fructose concentration of at least about 70% by weight.

4. A method in accordance with claim 1 in which step (a) is performed at a temperature of from about 130° F. to about 150° F. for from about 1 minute to about 10 minutes.

5. A method in accordance with claim 1 in which step (c) comprises so retaining said raisins in said atmosphere for from about 4 hours to about 24 hours.

6. A method in accordance with claim 1 in which step (c) comprises submerging said raisins in said liquid medium without agitation.

7. A method in accordance with claim 1 in which step (b) is/ performed at a temperature of from about 140° F. to about 175° F.

8. A method in accordance with claim 1 in which step (b) is performed at a temperature of from about 150° F. to about 170° F.

9. A method in accordance with claim 1 in which step (c) is performed at a temperature of from about 90° F. to about 110° F.

10. A method in accordance with claim 1 in which step (d) is performed at a temperature of from about 140° F. to about 165° F.

11. A method for treating raisins to retain softness and flavor when incorporated into food preparations in which said raisins are in contact with dry absorptive food ingredients, said method comprising:
   (a) blanching said raisins by contacting said raisins with water at a temperature of about 130° F. to about 150° F. for about one minute to about 10 minutes;
   (b) infusing said raisins with fructose by continuously agitating said raisins in an infusion solution of fructose as the sole saccharide at a fructose concentration of at least about 70% by weight, at a temperature of from about 150° F. to about 170° F. for from about 30 seconds to about 90 seconds to raise the fructose:dextrose weight ratio in said raisins to from about 1.5:1 to about 2.0:1;
   (c) tempering raisins so infused by at least partially submerging a batch of said raisins in a quantity of said infusion solution at a temperature of from about 90° F. to about 110° F. for from about 4 hours to about 24 hours; and
   (d) drying raisins so tempered in air at a temperature of from abut 140° F. to about 165° F.

* * * * *